(12) United States Patent
Troitsky et al.

(10) Patent No.: US 11,028,723 B1
(45) Date of Patent: Jun. 8, 2021

(54) GAS TURBINE GENERATOR LOAD LEVEL CONTROL SYSTEM

(71) Applicant: Rolls-Royce Marine North America Inc., Walpole, MA (US)

(72) Inventors: Ivan Troitsky, Indianapolis, IN (US); Ainsmar Brown, Indianapolis, IN (US); James Greg Steinrock, Columbus, IN (US); Donald Silverstein, Indianapolis, IN (US)

(73) Assignee: ROLLS-ROYCE MARINE NORTH AMERICA INC., Walpole, MA (US)

( * ) Notice: Subject to any disclaimer, the term of this patent is extended or adjusted under 35 U.S.C. 154(b) by 0 days.

(21) Appl. No.: 16/691,435

(22) Filed: Nov. 21, 2019

(51) Int. Cl.
| F01D 15/04 | (2006.01) |
| F01D 15/10 | (2006.01) |
| H02P 29/40 | (2016.01) |
| H02P 3/00 | (2006.01) |
| H02K 7/18 | (2006.01) |

(52) U.S. Cl.
CPC ........... *F01D 15/045* (2013.01); *F01D 15/10* (2013.01); *H02P 3/00* (2013.01); *H02P 29/40* (2016.02); *H02K 7/1823* (2013.01)

(58) Field of Classification Search
CPC .......... H02P 3/00; H02P 29/40; H02K 7/1823
USPC .................................. 318/434, 34
See application file for complete search history.

(56) References Cited

U.S. PATENT DOCUMENTS

| 2,627,597 | A | 2/1953 | Johansson |
| 4,455,614 | A | 6/1984 | Martz et al. |
| 5,896,736 | A | 4/1999 | Rajamani |
| 6,367,570 | B1 | 4/2002 | Long, III et al. |
| 6,784,565 | B2 | 8/2004 | Wall et al. |
| 6,812,586 | B2 | 11/2004 | Wacknov et al. |
| 6,900,556 | B2 | 5/2005 | Provanzana et al. |
| 6,958,550 | B2 | 10/2005 | Gilbreth et al. |
| 7,012,392 | B2 | 3/2006 | Nguyen et al. |
| 7,116,073 | B1 * | 10/2006 | Sorkin ............... H02P 23/10 318/530 |
| 8,269,449 | B2 * | 9/2012 | Bjerknes ............ H02P 1/26 318/723 |

(Continued)

FOREIGN PATENT DOCUMENTS

| CA | 2 318 944 C | 9/2007 |
| CN | 104753402 A | 7/2015 |
| RU | 2007-103196 A | 8/2008 |

OTHER PUBLICATIONS

"Post Glover Dynamic Braking Resistors," dated at least as early as Jun. 13, 2013, pp. 1-2, Post Glover Resistors, Inc., PGR Document #DB002-10.

(Continued)

*Primary Examiner* — David Luo
(74) *Attorney, Agent, or Firm* — Brinks Gilson & Lione (57) ABSTRACT

A system includes a gas turbine engine, a generator coupled with the gas turbine engine, and controller circuitry. The generator may be rotatable by the gas turbine engine to generate electric power on a load bus. The controller circuitry may control the load bus to manage an output torque of the gas turbine engine in accordance with a load demand present on the generator. The controller circuitry may dynamically alternate supply of electric power from the load bus to a first load and a second load to maintain operational transient parameters of the gas turbine engine within a predetermined range.

20 Claims, 6 Drawing Sheets

(56) References Cited

U.S. PATENT DOCUMENTS

| | | | |
|---|---|---|---|
| RE43,956 E | | 2/2013 | King et al. |
| 8,659,185 B2 | | 2/2014 | Coons et al. |
| 8,803,458 B2 | | 8/2014 | Horikoshi et al. |
| 10,050,433 B2 | | 8/2018 | Panosyan et al. |
| 10,205,415 B2 | * | 2/2019 | Blackwelder ............ H02P 9/30 |
| 10,401,885 B2 | | 9/2019 | Bollman et al. |
| 2005/0285554 A1 | | 12/2005 | King et al. |
| 2006/0220387 A1 | | 10/2006 | Tsuzuki |
| 2009/0312885 A1 | | 12/2009 | Buiel |
| 2010/0270864 A1 | | 10/2010 | Vyas et al. |
| 2014/0103727 A1 | | 4/2014 | Taimela et al. |
| 2014/0159365 A1 | | 6/2014 | Algrain |
| 2017/0214243 A1 | | 7/2017 | Rancuret et al. |

OTHER PUBLICATIONS

Choe, J-M, et. al., "System for Load Leveling Control and Operation of an Energy Storage System", dated Mar. 2, 2017, pp. 739-745, vol. 10, Iss. 7, IET Power Electron., 2017.

\* cited by examiner

GAS TURBINE GENERATOR LOAD LEVEL CONTROL SYSTEM

TECHNICAL FIELD

This disclosure relates to gas turbine engines and, in particular, to gas turbine engine generator load leveling.

BACKGROUND

Gas turbine engines provide torque on a rotating shaft by combustion of fuel to rotate a compressor and downstream turbine. An AC (alternating current) or DC (direct current) generator converts mechanical power into electric power. Generators may include a rotor and a stator where the rotor or the stator is coupled with a rotating prime mover, such as a gas turbine engine to generate electric power.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

The systems and methods described herein relate to a system that may include a gas turbine engine and a generator coupled with the gas turbine engine. The generator is rotatable by the gas turbine engine to generate electric power on a load bus. The system may also include controller circuitry configured to control the load bus to manage an output torque of the gas turbine engine in accordance with a load demand present on the generator. At least one first load and at least one second load may be selectively supplied power by the load bus as pulse loads. The controller circuitry may dynamically alternate supply of electric power from the load bus to the first load and the second load to maintain operational transient parameters of the gas turbine engine within a predetermined range.

An interesting feature of the system relates to the first load and the second load each being a pulse load of greater than 50% of rated output power of the generator.

Another interesting feature of system relates to the impedance of the first load and the second load being substantially equal.

During example operation, the generator may be rotationally driven by the gas turbine engine to output electric power to a load bus in order to supply a load demand present on the load bus. The first load may be energized with the load bus and an output torque demand of the gas turbine engine may be increased in accordance with an increase in the load demand on the load bus. The controller circuitry may direct cycling between energizing, with the load bus, the first load and the second load to substantially maintain the increase in the load demand on the load bus as the first load and the second load are sequentially energized and deenergized. The output torque demand of the gas turbine engine may be maintained substantially unchanged during the cycling.

Another interesting feature of the systems and methods described relates to the second load being a load substantially duplicative of the first load, or being a dynamic braking resistor selectively available to slow a motor electrically coupled with a source of electric power other than the generator. The controller circuitry is configured to confirm the second load is duplicative of the first load or that the dynamic braking resistor is not currently being used to slow the motor before dynamically alternating supply of electric power to the first load and the second load.

Another interesting feature relates to the controller circuitry directing cycling between energizing the first load and the second load, since such cycling may include energizing the second load while the first load is being deenergized and subsequently energizing the first load while the second load is being deenergized.

Figure 1:
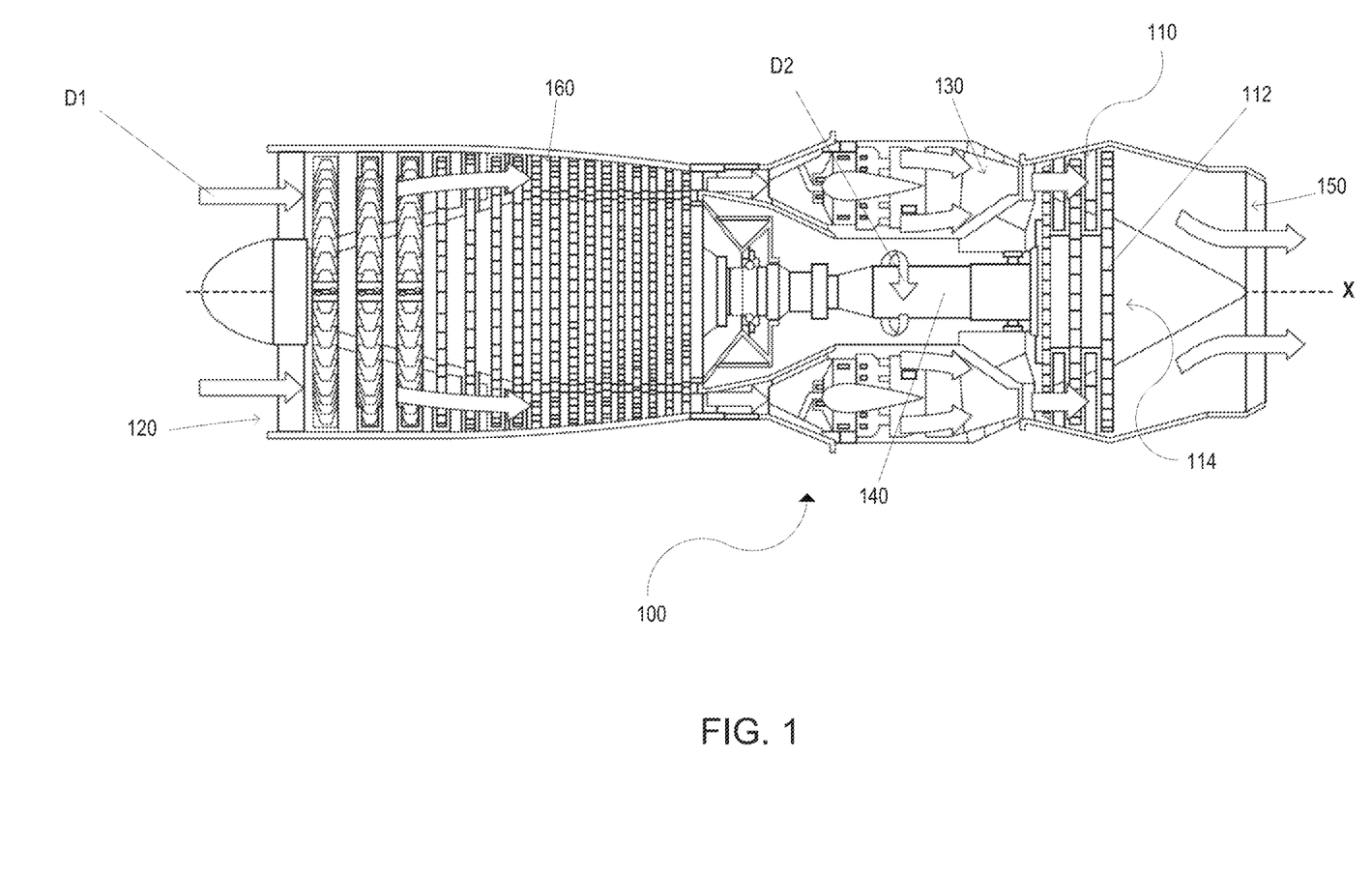
FIG. 1 illustrates a cross-sectional view of an example of a gas turbine engine.

FIG. 1 is a cross-sectional view of a gas turbine engine 100. In some examples, the gas turbine engine 100 may supply power to and/or provide propulsion of a watercraft or aircraft. Examples of a watercraft include a ship, vessel or boat having a propeller, impeller or fan blades, which are provided electrical or mechanical power by the gas turbine engine, and examples of an aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration other supplying propulsion to an aircraft or watercraft such as, for example, an industrial application, an energy application, a power plant, a pumping set, a marine application, a weapon system, a security system, a perimeter defense and/or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

Figure 2:
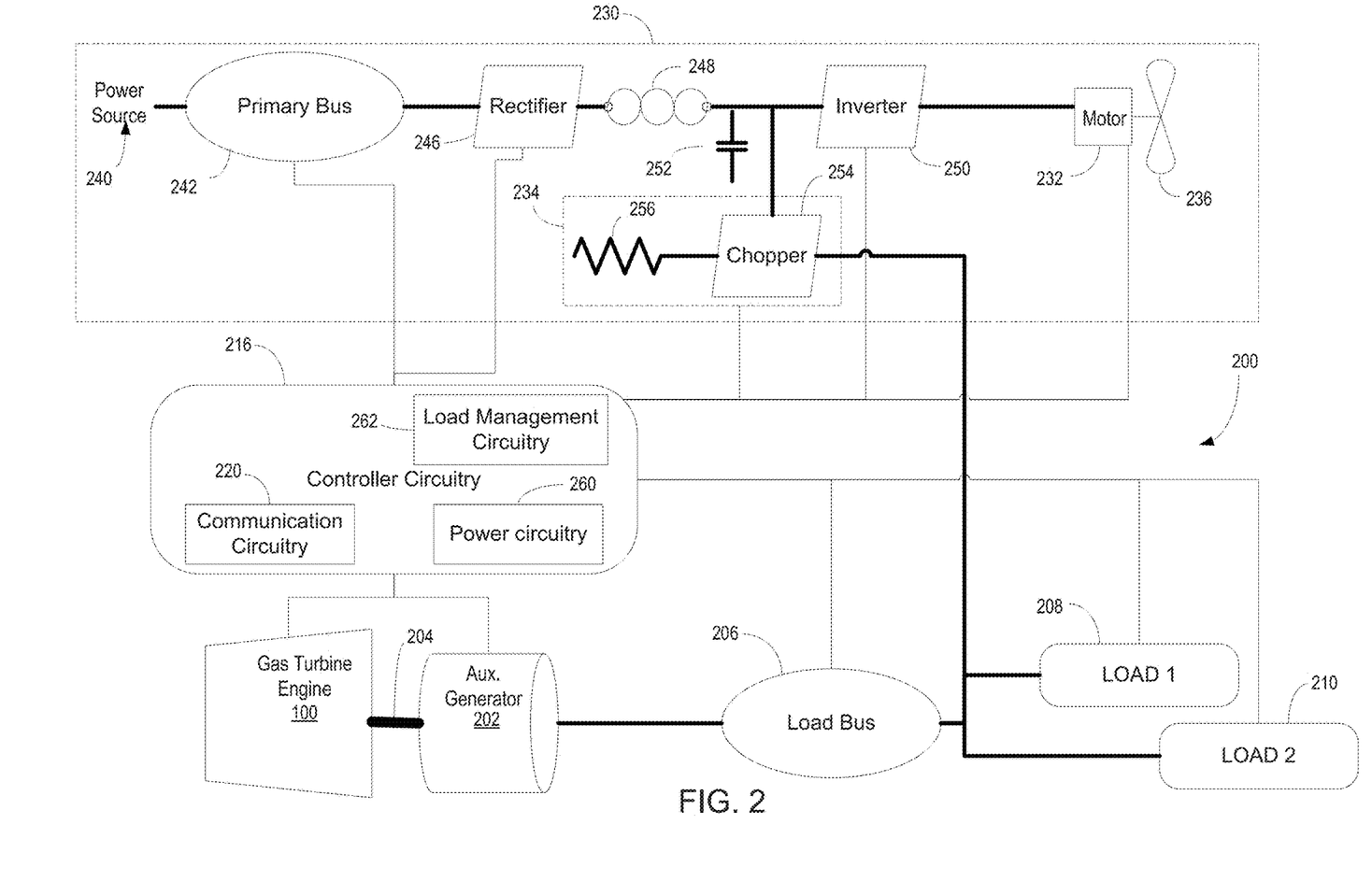
FIG. 2 is a block diagram illustrating an example gas turbine engine generator (GTG) load leveling system.

FIG. 2 is a block diagram illustrating an example gas turbine engine generator (GTG) load leveling system 200. The GTG load leveling system 200 includes an auxiliary generator 202 rotatably driven by a shaft 204 of a gas turbine engine 100 in order to output electric power to supply a load bus 206. The auxiliary generator 202 may be an AC or DC machine, and may include rectifiers, converters and the like (not shown) to control a load demand on the load bus 206. The generator 202 may include any type of electrical generator. Examples of the generator 202 may include a synchronous generator, an induction generator, an asynchronous generator, a permanent magnet synchronous generator, an AC (Alternating Current) generator, a DC (Direct Current) generator, a synchronous generator with stator coils, or any other device that converts mechanical power to electric power.

The load bus 206 may selectively supply power to a number of different loads including a first load 208, and a second load 210. The load bus 206 may include any connector or connectors that conduct electricity. Examples of the load bus 206 may include a bus bar, a busway, a bus duct, a solid tube, a hollow tube, a wire, an electrical cable, or any other electrical conductor.

The GTG load leveling system 200 also includes a controller circuitry 216. The circuitry of the controller 216 may include executable logic stored in memory to provide at least a portion of the functionality described herein. The controller 216 may include communication circuitry 220 to provide signal input/output capability for communication with the gas turbine engine 100, the auxiliary generator 202, the load bus 206, the first load 208 and the second load 210. The controller 216 may receive parameters, such as operational values via the communication circuitry 220. In addition, the controller may output parameters and control commands via the communication circuitry 220. Communication via the communication circuitry 220 may be wired or wireless, and may in the form of individual signals, groups of signals, network communication protocols, proprietary protocols and/or other forms of electronic based messaging or signal transmission.

The GTG load leveling system 200 may be coupled with a vehicle drive power system 230 having at least one motor 232, which is controlled with a dynamic braking system 234. The vehicle drive power system 230 may, for example, be for a watercraft such as a ship, in which propulsion is provide by the motor 232 via respective propeller(s) or fan(s) 236. Power may be variably supplied to the motor 232 by an electric power source 240 via a primary bus 242. The electric power source 240 may be any source of electric power. In the illustrated example, variable alternating current (AC) power is supplied by the primary bus 240 via a rectifier 246, a direct current (DC) link 248 and an inverter 250 to the motor 232, and a capacitor 252 may provide a high frequency shunt to ground. The dynamic braking system 234 may include a chopper circuit 254 providing a voltage regulation function and/or a switching function, and a dynamic brake resistor (DBR) 256 providing a resistive sink for excess power. During operation, when the motor 232 is rotating faster than desired, such as during stopping, slowing quickly, and/or reversing direction of motor rotation, the motor 232 acts as a generator and thereby produces electrical energy, which is directed to the dynamic braking system 234 for release through the DBR 236.

The controller 216 may receive and transmit variables and control commands to the vehicle drive power system 230. In an example, the vehicle drive power system 230 may include one or more separate and independent control systems operating and providing the functionality of the vehicle drive power system 230. For example, speed and navigation of a watercraft using (among other things) the motor 232 may be separately monitored and controlled. Alternatively, or in addition, some portion, or all, of the functionality of the vehicle drive power system 230 may be provided by the controller 216. In addition, GTG load leveling system 200 may be fully controlled by the controller 216. Alternatively, or in addition, the GTG load leveling system 200 may include different controllers or control sub-systems performing portions of the functionality of the GTG load leveling system 200. For example, the gas turbine engine 100 may be separately monitored and controlled with a control system such as a full authority digital electronics control (FADEC) that is in communication with the communications circuitry 220 of the controller 216.

The controller 216 may be in communication with gas turbine engine 100 and the auxiliary generator 202 to receive operational parameters. For example, the auxiliary generator 202 may provide a load demand signal, and the gas turbine engine 100 may provide a temperature signal indicative of an operational temperature of the gas turbine engine 100. In addition, the controller 216 may monitor and control the load bus 206 and the first and second loads 208 and 210. In addition, the controller 216 may be in communication and/or receive and monitor other operational parameters of the GTG load leveling system 200 and/or the vehicle drive power system 230 via the communication circuitry 220.

The controller circuitry 216 may also include power circuitry 260. The load bus 206 and the first and second loads 208 and 210 may include or be electrically connected with the power circuitry 260, such as a device or combination of devices that switch and/or control and/or convert electric power. Examples of the power circuitry 260 may include a power converter, a rectifier, an AC to DC converter, a switching device, a diode, a thyristor, an inverter, a transistor, and a capacitor. The power circuitry 260 may include semiconductor and/or solid state devices as well as circuit breakers, switches, fuses and other switching device(s) and/or systems capable of energizing and de-energizing the load bus 206 and/or the first and second loads 208 and 210 as described herein.

In an example system, each of the first and second loads 208 and 210 may be short duration high energy loads, such as, for example, 100-200 MW loads that are energized continuously for a predetermined relatively short period of time, such as less than 1 minute. Thus, each of the first and second loads 208 and 210 may be referred to as a pulse load. When energized and then de-energized, each pulse load may represent a dynamic load demand creating a transient step change in load. In an example the step change in load demand may range from about zero to five percent to about (+/−five percent) fifty to ninety-five percent, or from about (+/−five percent) zero to five percent to eighty to ninety-five percent of the total load on the load bus 206 with step changes in bus loading occurring over a time period of about 100 milliseconds or less (where about is +/−10 milliseconds). Examples of the first and second load include vehicle electronics, a vehicle, an aircraft, a directed-energy weapon, a laser, a plasma weapon, a railgun, a microwave generator, a pulse-powered device or other power consuming system controlled by the controller 216.

The auxiliary generator 202 may be sized and rated to supply 100% of the expected peak power needed by the load on the load bus 206. Accordingly, an additional power source, such as a battery or other energy source supplying power to the load bus 206 may be omitted. In an example, each of the first load 208 and the second load 210 may be a pulse load of greater than 50% of the rated output power of the auxiliary generator 202, which are wholly supplied electric power from the auxiliary generator 202. Power generated by the auxiliary generator 202 is provided as function of rotational torque supplied to the shaft 204 with the gas turbine engine 100. As the load on the load bus 206 varies, the voltage and current on the load bus 206 and therefore the load demand on the auxiliary generator 202 correspondingly varies. Short term relatively small variations in load demand may be transients that are handled, or absorbed, by the auxiliary generator 202 by, for example, allowing variation in generator output voltage within an acceptable range. If, however, variations in load on the load bus 206, and corresponding changes in load demand, are too large and/or of too long duration, the auxiliary generator 202 may demand greater or lesser rotational output torque from the gas turbine engine 100. Variations in rotational torque of the gas turbine engine 100 may undesirably vary the operating temperature of the gas turbine engine 100 resulting in thermal cycles, which may lead to higher maintenance frequency, accelerated material fatigue, and the like.

In the GTG load leveling system 200, the controller 216 may dynamically manage the first and second loads 208 and 210 with load management circuitry 262 included in the controller circuitry 216. The load management circuitry 262 may include logic used to anticipate and avoid thermal cycling of the gas turbine engine 100. Anticipation and avoidance of thermal cycling may be accomplished by a prediction model included in the controller 216. The prediction model may provide predictions based on the operational parameters being monitored and lookup tables, artificial intelligence, machine learning, historical data and/or other information used to anticipate performance of the system.

The load management circuitry 262 may adjust the timing of energization and de-energization of the first and second load 208 and 210 to minimize thermal cycling of the gas turbine engine 100 above a predetermined threshold. In an example, The first load 208 and the second load 210 may be substantially equal, or substantially duplicative, such that the second load 210 is duplicative of the first load 208 and the timing of switching between the first load 208 and the second load 210 may be managed by the load management circuitry 262 in conjunction with the power circuitry 260 to minimize thermal cycling. "Substantially equal" or "substantially duplicative" in this context means that the impedance of the first load 208 and the second load 210 consume an amount of electric power from the load bus 206, such that the load demand on the auxiliary generator 206 is within +/−10% when supplying electric power to either of the first load 208 or the second load 210.

An example of cycle time management control by the controller 216 may involve, a situation where the timing of de-energizing the first load 208 and energizing the second load 210 creates transients in load demand on the load bus 206 that causes corresponding thermal cycling of the gas turbine above a pre-determined threshold. In this situation, the controller 216 may increase or decrease the cycle timing between de-energizing the first load 208 and energizing the second load 210 to lower the magnitude of transient load demand experience by the load bus 206.

In an example GTG load leveling system 200, the controller 216 may control load leveling on the load bus 206 with the load management circuitry 262 to indirectly manage the output torque of the gas turbine engine 100 in accordance with the load demand present on the generator 202. Load leveling may be performed by the controller 216 using the power circuitry 260 and the load management circuitry 262 to dynamically alternating supply of electric power from the load bus 206 to the pulse loads of the first load 208 and the second load 210. The dynamic switching may be performed with the controller 216 to maintain transient operational parameters, such as the operating temperature, of the gas turbine engine 100 within a predetermined range or below a predetermined threshold. In other examples, any number of first and second loads 208 and 210 may be included, and the controller 216 may use the power circuitry 260 and the load management circuitry 262 to dynamically alternate energizing and de-energizing pulse loads of any number of first and second loads 208 and 210.

Control of the gas turbine engine 100 may be separate and independent from control of the load demand on the generator 202 and/or the first and second loads 208 and 210. For example, during operation the gas turbine engine 100 may be separately and independently speed controlled to maintain a speed setpoint. As the load on the load bus 206, and the corresponding load demand on the generator 202 changes, the level of output torque from the gas turbine engine 100 to maintain rotational speed of the gas turbine engine 100 and the generator 202 at the speed setpoint may vary. The controller 216 may manage the loading of the load bus 206 independent of the control of the gas turbine engine 100.

Controlling the load on the load bus 206 may include the controller 216 monitoring one or more transient operational parameters of the gas turbine engine, such as an operational temperature. The loading of the load bus 206 may be managed by the controller 216 to avoid transient variations in the output torque of the gas turbine engine 100 resulting in the presence of undesirable cyclical changes in transient parameters of the gas turbine engine 100 as the first load 208 and the second load 210 are alternately supplied as pulse loads by the load bus 206. An example of a desirable predetermined range or predetermined cycling threshold of a transient operational parameters of the gas turbine engine 100 is maintaining an operational temperature of the gas turbine engine in a range of +/−25% or +/−30% of rated temperature.

Thus, the GTG load leveling system 200 may manage load leveling of the dynamic pulse loads (first load 208 and second load 210) with the goal of protecting the gas turbine engine 100 from experiencing undesirable repeated cycles, such as thermal cycles. Undesirable cycling of the gas turbine engine 100, such as thermal cycling, may result in accelerated component fatigue and a correspond decline in engine lifespan. To avoid such undesirable cycling, instead of using a single pulsed load in this dynamic pulse loading scenario, multiple pulse loads are coordinated to allow for a substantially continuous load level on the load bus 206 and corresponding substantially continuous torque demand at the gas turbine engine 100.

In an example, the first and second loads 208 and 210 may be selectively energized by the controller 216 in conjunction with one or more resistive dynamic load(s). The load management circuitry 262 may perform logic, such as a supervisory control algorithm, to manage an alternating load demand so that a level load profile may be maintained on the load bus 206. Thus, the GTG load leveling system 200 may effectively operate a number of pulse loads sequentially while maintaining transient operational parameters of the gas turbine engine 100 within a predetermined range as the load bus 206 may be used as an "endless energy magazine", repeatedly and sequentially supplying power to the pulse loads without undesirable cycling of the gas turbine engine 100.

The controller 216 may also discontinue dynamically cycling the pulse loads of the first and second loads 208 and 210. To avoid a large transient change in load on the load bus 206 when the dynamic cycling ends, the controller 216 may energize the dynamic braking resistor 256 as a continuously energized load (not a pulse load). The controller circuitry 216 may then direct a decrease in the output torque demand on the gas turbine engine 100, thereby decreasing the power output by the generator to the load bus 206. Since the dynamic braking resistor 256 is a resistive load, lower voltage and/or current as the generator 202 load demand is reduced does not negatively impact the load bus 206 and/or the dynamic braking resistor 256. Moreover, the output torque of the gas turbine engine 200 may be linearly and efficiently reduced without transient cycling, such as thermal cycling.

During example operation with the vehicle drive power system 230, the controller circuitry 216 may monitor one or more operational parameters of the gas turbine engine 100 and control a load demand of the auxiliary generator 202 to output electric power on the load bus 206. The generator 202 may be rotatably driven to generate the electric power by the output torque of the gas turbine engine 100. In other examples, the controller 216 may also, or alternatively, monitor other parts of the vehicle power drive system 230, such as the motor 232, the dynamic braking system 234, the rectifier 246, the inverter 250 or other operational parameters of the vehicle power drive system 230. The load demand on the generator 100 may be controlled by the controller 216 by controlling energization and de-energization of a first load 208 as the load on the load bus 206 and controlling energization and de-energization of the second load 210 as the load on the load bus. The controller 216 may control the transition between the load on the load bus being the first load and being the second load so as to maintain the load on the load bus 206 substantially unchanged by timing the transition between the load on the load bus 206 being the first load 208 and being the second load 210.

Figure 3:
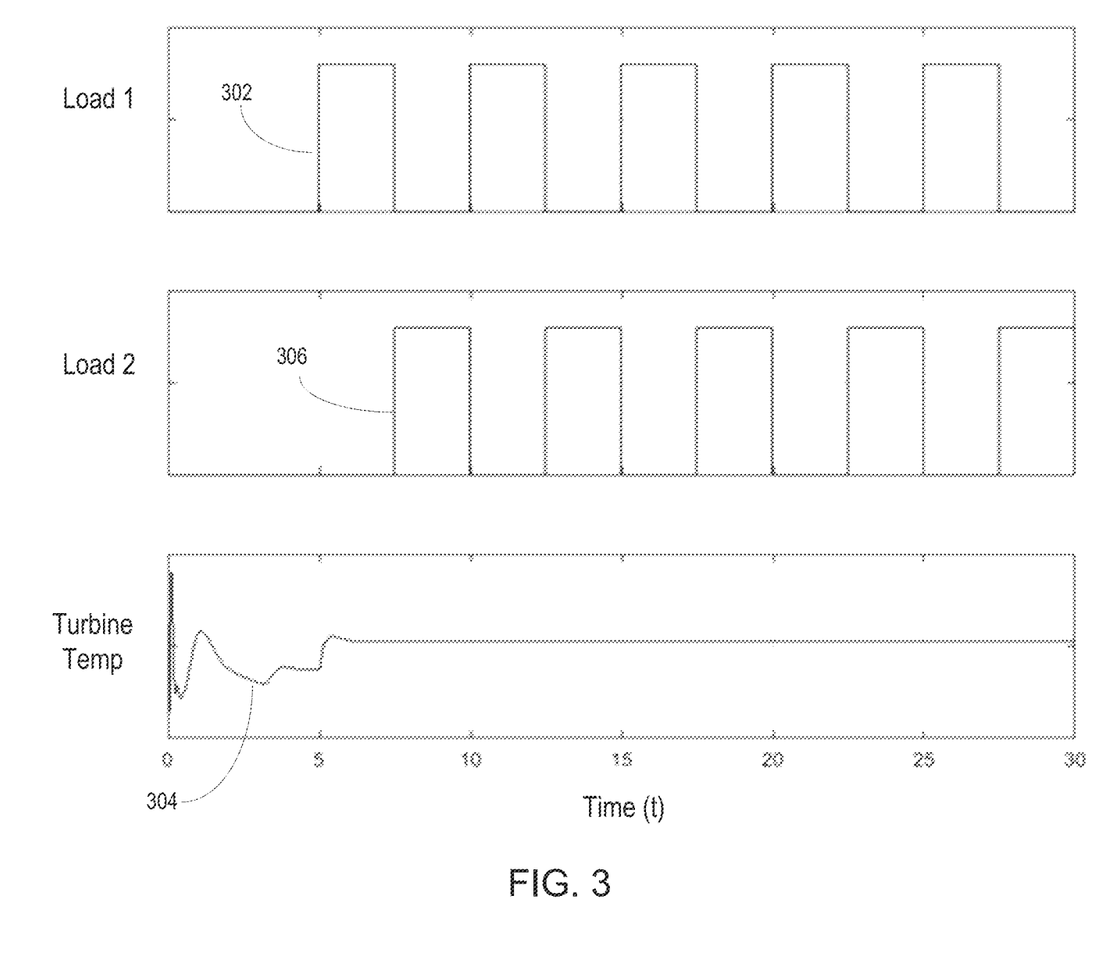
FIG. 3 is a series of operational diagrams illustrating example operation of the GTG load leveling system.

FIG. 3 is a series of operational diagrams illustrating example operation of the GTG load leveling system. Referring to FIGS. 2 and 3, in this example, the controller 216 may perform load leveling on the gas turbine engine 100 by controlling the first and second loads 208 and 210 over time (t). In FIG. 3, at time (t)=5 the controller 216 may control the GTG load leveling system 200 such that the first load 208 is energized in the form of a pulse load 302. In response to the pulse load 302, the demand on the auxiliary generator 202 increases. In an example, a full load rating of the generator 202 is 105%-110% of the first load 208 or the second load 210. Accordingly, when the first load 208 is energized, the load demand on the generator 202 may increase from between 0% and 10% to between 90% and 100% of rated output of the generator 202. Operational parameters, such as an operational temperature 304, of the gas turbine engine 100 correspondingly vary as the output torque of the gas turbine engine 100 is increased (or decreased) to satisfy the load demand on the generator 202.

At time (t) of about 7, the first load 208 is de-energized and the second load 210 is energized in the form of a pulse load 306. The controller 216 may coordinate the energization of the second load 210 and the de-energization of the first load 208 such that the load demand on auxiliary generator 202 may remain substantially unchanged. The load demand may remain substantially unchanged since the controller 216 dynamically alternates supply of electric power from the load bus 206 to the first load 208 and the second load 210 to maintain transient operational parameters, such as the temperature of the gas turbine engine 100 within a predetermined range. Accordingly, the controller 216 may control the load on the load bus 206 to manage the output torque of the gas turbine engine 100 in accordance with a load demand present on the auxiliary generator 202. In other words, the load demand on the auxiliary generator 202 may be managed by the controller 216 to be substantially unchanged by controlling the load on the load bus 206 so that the rotational torque requirements of the generator 202 remain within a range that does not create undesirable variations in the operational parameters of the gas turbine engine 100.

In an example, load variations (or transients) on the load bus 206, due to transitioning between the first load 208 and the second load 210, of less than 25% for under 0.5 seconds may be absorbed by the generator 202. The auxiliary generator absorbing such "instantaneous" load demand may, for example, result in changes in voltage and/or current flow on the load bus 206 without creating a significant change in demand for rotational torque output by the gas turbine engine 100. In addition, or alternatively, load variations that may cause changes in output torque demand of the gas turbine engine 100 of a relatively short duration may be absorbed by the gas turbine engine, resulting in acceptable variations in transient operational parameters. For example, relatively small thermal constants in the gas turbine engine 100 may resulting in little or no variation in the temperature of the gas turbine engine. An example factor affecting changes in a transient operational parameter is a time constant for gas temperature changes at the turbine section outlet, which may be referred to as turbine outlet temperature (TOT). The TOT may respond relatively quickly, such as within 0.5 seconds, with undesirable temperature variations to relatively large load variations (such as a 50% or greater step change in load), whereas with lesser step changes in load, the temperature variations due to variations in load may be lower and/or within an acceptable range for a long enough period of time, thereby avoiding undesirable cycling.

In this regard, the actual amount of load variations (or transients) that are undesirable will be a function of characteristics of the generator 202 and the gas turbine engine 100, along with other parameters such as the aggressiveness of the torque demand for output torque from the gas turbine engine 202. Accordingly, dynamic cycling between the first load 208 and the second load 210 may be controlled by the controller 216 such that the load demand of the generator 202 remains substantially unchanged as the controller 216 dynamically alternates between the first load 208 and the second load 210. Thus, by controlling cycling between the first load 208 and the second load 210 with the controller 216, the output torque of the gas turbine engine 100 may also be substantially unchanged. As used herein, the output torque of the gas turbine engine being "substantially unchanged" or "substantially maintained" or "substantially constant" refers to changes in the operation of the gas turbine engine that do not result in undesirable cycling of the gas turbine 100, such as thermal cycling. The load demand on the generator 202 or load on the load bus 206 being "substantially unchanged" or "substantially maintained" or "substantially constant" as used herein refers to an absence of corresponding changes in output power of the generator 202 that result in undesirable cycling of the gas turbine 100, such as thermal cycling.

Figure 4:
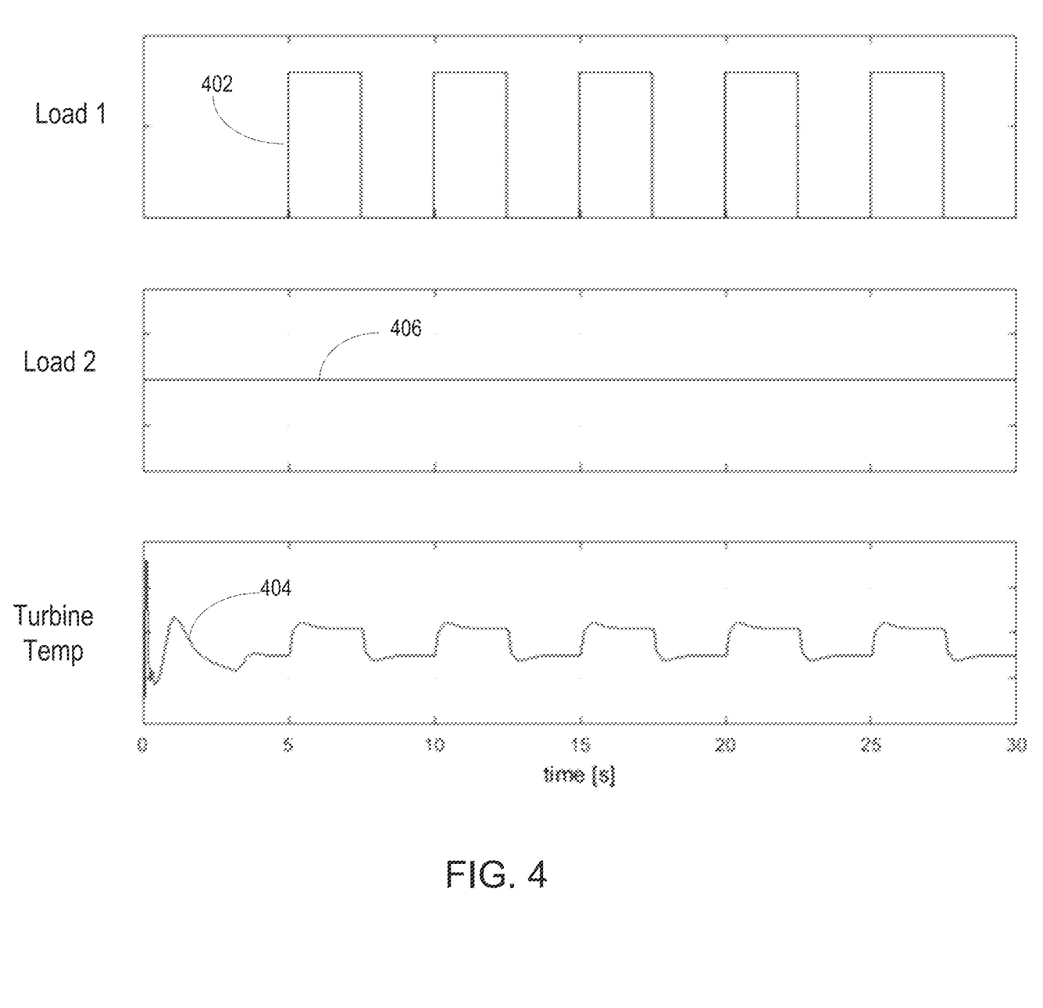
FIG. 4 is another series of operational graphs illustrating example operation of the GTG load leveling system.

FIG. 4 is another series of operational graphs illustrating example operation of the GTG load leveling system. In this example, the controller 216 may control energization and de-energization of only one of the first load 208 or the second load 210 as a pulse load over time (t). As illustrated in the example of FIG. 4, with reference to FIG. 2, the first load 208 as represented by pulse load 402, is sequentially supplied electric power by the load bus 206, whereas the second load 210 remains at a zero pulse load 406 (de-energized). As a result, upon energization and de-energization of the pulse load 402, undesirable cyclically variations (or transients) in the operational parameters, such as an operational temperature 404 of the gas turbine engine 100 may occur due to changes in rotational torque output requirements of the gas turbine engine 100.

Referring again to FIG. 2, in the event that one of the first load 208 or the second load 210 is unavailable for energization, the GTG load leveling system 200 may still minimize undesirable cyclical operation of the gas turbine engine 100 using another existing load in place of the load unavailable for energization. For example, in the illustrated example of FIG. 2, the GTG load leveling system 200 is coupled with a vehicle drive system 230 that includes a dynamic braking system 234. In the illustrated configuration, the controller 216 may selectively use the dynamic braking resistor 256 for load leveling. The impedance of the dynamic braking resistor 256, or some portion thereof, may be substantially equal to the impedance of the first load 208 or the second load 210. In other examples, other existing loads with substantially equal impedance to the first load 208 and the second load 210 may be used as the another existing load.

Figure 5:
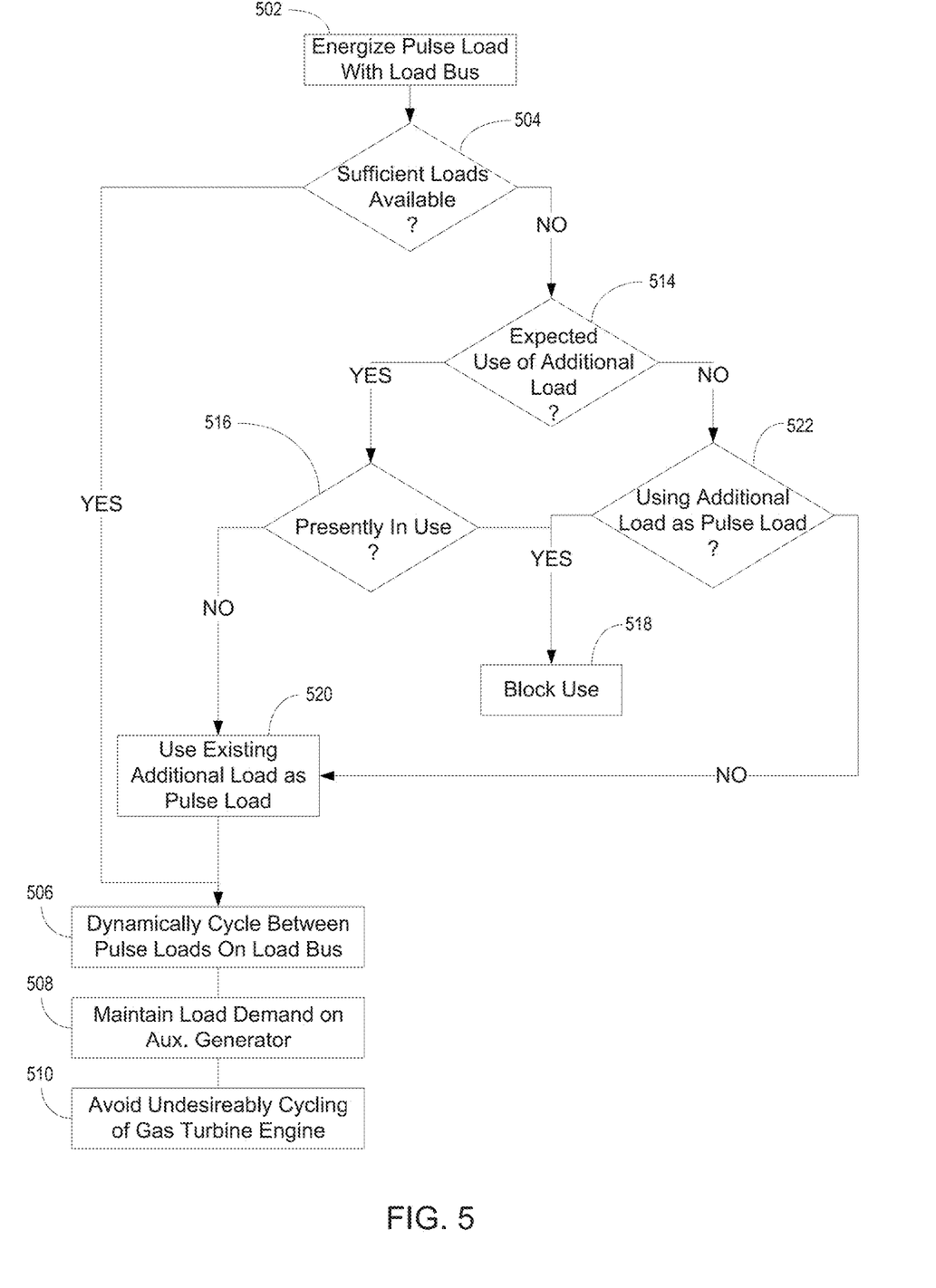
FIG. 5 is an operational flow diagram of example operation of the GTG load leveling system.

FIG. 5 is an operational flow diagram of example operation of the GTG load leveling system in connection with use of an existing load and/or at least one of the first and second loads. Referring to FIGS. 2 and 5, in this example, the GTG load leveling system 200 is coupled with the vehicle drive system 230, which is independently operated to provide propulsion to the vehicle. In other examples, the controller 216 may control operation of both the GTG load leveling system 200 and the vehicle drive system 230. The operation begins with receipt, by the controller 216 of a request to energize a pulse load from the load bus 206. (502) Such a request may be a signal initiated by a user, or from another system, such as the vehicle drive system 230. The controller 216 may determine if sufficient pulse loads are available for selective energization to control and manage level loading on the load bus 206. (504) In addition, the controller 216 may confirm that the impedance of the second load is duplicative of the first load.

If sufficient pulse loads are available for energization, the controller 216 may direct the power circuitry 260 to dynamically cycle between energizing, with the load bus 206, the first load(s) 208 and the second load(s) 210 to substantially maintain the increased load demand on the load bus 206 as the first load(s) 208 and the second load(s) 210 are sequentially energized and de-energized as pulse loads. (506) The controller 216 may energize the second load 210 and de-energize the first load 208 in parallel, and energize the first load 208 and de-energize the second load 210 in parallel such that the load demand present on the load bus 206 remains substantially unchanged, thereby maintaining the load demand on the auxiliary generator 202 substantially constant. (508) Parallel energization and de-energization of the loads may be simultaneous, or may include a time gap or delay so long as the transients on the load bus 206 resulting from the switching are absorbed by the auxiliary generator 200 or otherwise avoid cycling of transient operational parameters of the gas turbine engine 100, as discussed elsewhere. Due to the controller 216 leveling the load provided by the load pulses on the load bus 206, the output torque demand of the gas turbine engine 100 may be maintained as substantially unchanged during the cycling of the pulse loads. (510)

If the controller 216 determines there are insufficient pulse loads available to maintain the load on the load bus 206 substantially constant, the controller 216 may determine if additional existing loads are available in the existing system, such as the vehicle drive system 230. (514) In the illustrated example, the additional existing load(s) may be the dynamic load resistor 256 in the dynamic braking system 234. Thus, the dynamic braking resistor 256 may selectively replace either the first or second load 208 or 210 and be used as a pulse load as well as being used to selectively slow rotation of the motor 232. In other examples, other existing load(s) in the existing system, such as compressors, pumps and the like, which have a predetermined impedance that substantially match the pulse load being energized by the load bus 206 may be used. In still other examples, GTG load leveling system 200 may include a resistor or other energy sink with a predetermined impedance substantially matching the first and second loads 208 and 210 that is capable of being a pulse load when needed for load leveling the load bus 206.

In the example of FIG. 2, the motor 232 included in the vehicle drive system 230 may be operating to provide propulsion to the vehicle, and the dynamic braking system 234 may be intermittently used by the drive motor 232 to produce a braking torque during overhauling conditions. Thus, the controller 216 may determine availability of the additional load in the existing system for use as a pulse load by determining if the existing system, in this example motor 232, is requesting or anticipating use of the additional load (dynamic braking resistor 256) during operation to provide propulsion to the vehicle. (514) For example, the motor 232 may be requesting braking using the dynamic braking system 234. Thus, the controller circuitry 216 may confirm that the dynamic braking resistor 256 is not being used to slow rotation of the motor 232 before directing supply of power to the dynamic braking resistor 256.

If the additional load is not anticipated to be used, the controller 216 may confirm that the additional load is available and not currently being used/controlled in the existing system. (516) Upon confirmation that the additional load(s) is not being used, the additional load(s) may be energized and de-energized via the controller 216 as a pulse load in place of or in addition to the first load 208 and the second load 210. (520) The pulse loads may be dynamically cycled to maintain load demand on the auxiliary generator 202, and avoid undesirable cycling of the gas turbine engine 100 (506, 508, 510)

In other examples, availability may relate to whether the additional load(s) is fully operational, off line for maintenance, and/or requested but not yet being used. For example, the existing system may have requested but not yet energized the dynamic braking system 234 thereby rendering the additional load unavailable. In example configurations, the existing system may have priority or precedence regarding use of the additional load. For example, the use of the load braking system 234 by the drive motor 232 may take precedence over use of the dynamic load resistor 256 as an additional pulse load.

In an example, the controller circuitry 216 may include Request Cypher Lock (RCL) control logic as part of the load management circuitry 262. The Cypher lock logic may place priority for which system has precedential access to use an additional load, such as the dynamic braking resistor 256. In an example of a vehicle drive system 230, the primary focus in the controller 214 gaining access to the additional load for use as a pulse load may be to avoid compromising operation of the vehicle drive system 230 so that the existing vehicle drive system 230 is not forced to operate in a dangerous or operationally deficient condition. In this example, the priority may be given to the drive motor's 232 use or anticipated use of the dynamic braking system 234 such that the controller 216 will forego use of the dynamic load resistor 256 as a pulse load until the motor 232 no longer needs the dynamic braking system 234.

If the additional load is presently in use in the existing system, the requested use of the additional load by the controller 216 as a pulse load is blocked. (518) If it is determined by the controller 214 at (514) that there is no expected use of the additional existing load(s) in the existing system (available), the controller 216 may confirm that the additional load(s) are not presently in use as a pulse load. (522) If the additional load(s) are presently in use as pulse loads, further use may be blocked. (518) If the additional load(s) are not presently being used as pulse loads, the existing additional load(s) may be used as pulse loads (520), by being dynamically cycled to maintain load demand on the auxiliary generator 202, and avoid undesirable cycling of the gas turbine engine 100 (506, 508, 510).

During operation, the GTG load leveling system 200 is configured to maintain the load demand of the generator 202 substantially unchanged as the controller circuitry 216 dynamically alternates between the first load 208 and the second load 210 such that the output torque of the gas turbine engine 100 is also substantially unchanged. The first load 208 and the second load 210 may represent pulse loads that are substantially the same magnitude and duration. The controller circuitry 216 may control cycling of power between energizing the first load 208 and the second load 210 by sequentially pulsing the first load 208 and then the second load 210 with electric power from the load bus 206. Cycling between energizing the first load 208 and the second load 210 may be accomplished by energizing the second load 210 while the first load 208 is being de-energized and subsequently energizing the first load while the second load is being de-energized.

The GTG load leveling system 200 may use an additional existing load, such as a dynamic brake resistor in addition to and/or in place of one of the first and second loads 208 and 210. In an example, the second load 210 is another load substantially equal to the first load 208, or is the dynamic braking resistor 256 configured for selective energization to slow the motor 232 supplied electric power from another power source 240. In this example, cycling between energizing the first load 208 and the second load 210 may include the controller 216 confirming the another load is unavailable, and then confirming that the dynamic braking resistor 256 is not being used to slow the motor 232 before energizing the dynamic braking resistor 256 as the second load 210.

Figure 6:
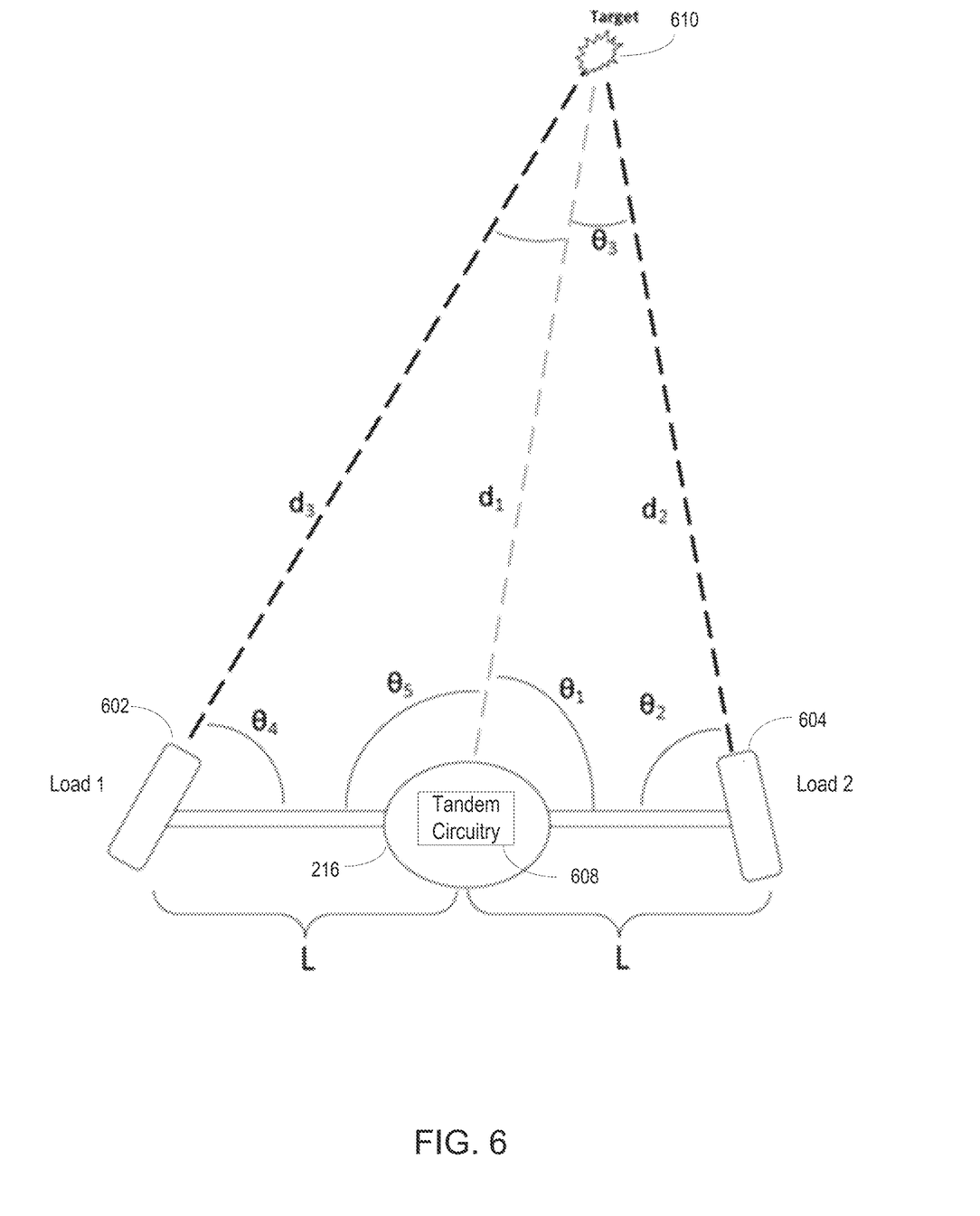
FIG. 6 is a block diagram of an example of a portion of the GTG load leveling system.

FIG. 6 is a block diagram of an example of a portion of the GTG load leveling system 600. The GTG load leveling system 600 may be included in, implemented in, or electrically coupled with a vehicle drive power system for a vehicle such as a ship. In FIG. 6, the GTG load level system 600 includes a first load 602 and a second load 604, which are pulse loads selectively energized and de-energized by the controller from the load bus. The load bus may be suppled electric power by a generator, which is rotatabley driven by a gas turbine engine. For purposes of brevity, the discussion and illustration of the features and functionality discussed with reference to FIGS. 1-5 may not be discussed or presented in FIG. 6. The features and functionality of FIGS. 1-5 may be included partially or in their entirety in the system(s) discussed with reference to FIG. 6, unless otherwise noted. Likewise, the features and functionality of FIG. 6 may be included partially or in their entirety in the system(s) discussed with reference to FIGS. 1-5.

In an example system that includes the GTG load leveling system 600 the controller circuitry 216 may include tandem circuitry 608 for use in load leveling the pulse loads present on the load bus. In this example, the first load 602 and the second load 604 may be equipment loads in the form of lasers. The tandem circuitry 608 may be used in tracking a target 610 of the first load 602 and the second load 604. In other examples, the first and second loads 602 and 604 may be other types of equipment loads that may be tracked to the target 610.

The tandem circuitry 608 may use information from a navigation system, such as a radar or satellite to identify a geographic location of the target 610 and the first and second loads 602 and 604. For example, the vehicle drive power system may include a radar or satellite based tracking system providing coordinates in the form of global positioning coordinates. Based on these coordinates, the tandem circuitry 608 may determine a distance d1 from the tandem circuitry 608 to the target 610 based on the known distances d2 and d3 between the respective load 1 602 and load 2 604 and the target 610 and length L between the respective load 1 602 and load 2 604 and the controller circuitry 216. The tandem circuitry 608 may then determine independent angular positions of the first and second loads 602 and 604 such that both loads, lasers in this example, are aligned to strike the target 610 from different locations. Determination of the independent respective angular positions $\theta_2$ and $\theta_4$ for the respective loads 602 and 604 may be determined from:

$$\theta_2 = \sin^{-1}\left(\frac{d_1 \sin(\theta_1)}{\sqrt{d_1^2 + L^2 - 2d_1 L \cos(\theta_1)}}\right) \quad \text{Equation 1}$$

$$\theta_4 = \sin^{-1}\left(\frac{d_1 \sin(\theta_5)}{\sqrt{d_1^2 + L^2 - 2d_1 L \cos(\theta_5)}}\right) \quad \text{Equation 2}$$

Thus, using centrally located controller circuitry 216, each of the first and second loads 602 and 604 may be independently maneuvered and sited on the target 610. Once cited on the target 610, the first and second loads 602 and 604 may be sequentially energized and de-energized as pulse loads to load level and thereby avoid thermal cycling of the gas turbine engine driving the auxiliary generator. In another example implementation with a moving target, the measured time derivatives of d1 and ⊖(theta)1 may be propagated through Equations 1 and 2 for the computed time derivatives of ⊖(theta)5, ⊖(theta)4 and ⊖(theta) 2 to provide the appropriate localization algorithm for such a moving target.

The methods, devices, processing, circuitry, and logic described herein may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Components of the GTG load leveling system and/or the vehicle drive power system described herein may include additional, different, or fewer components. For example, the output of the generator may be provided to a converter such as a DC to DC converter or an AC to DC converter or an AC to AC converter. In addition, the features and functionality of the GTG load leveling system and/or the vehicle drive power system described herein may include additional, different, greater or fewer operations than illustrated and/or discussed. In addition, the operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system comprising:
    a gas turbine engine;
    a generator coupled with the gas turbine engine, the generator rotatable by the gas turbine engine to generate electric power on a load bus;
    controller circuitry configured to control the load bus to manage an output torque of the gas turbine engine in accordance with a load demand present on the generator; and
    a first load and a second load, the controller circuitry configured to dynamically alternate supply of electric power from the load bus to the first load and the second load to maintain operational transient parameters of the gas turbine engine within a predetermined range.
2. The system of aspect 1, wherein the first load and the second load are each a pulse load of greater than 50% of rated output power of the generator.
3. The system of aspect 2, wherein the impedance of the first load and the second load are substantially equal.
4. The system as in any of aspects 1-3, wherein the second load is a dynamic braking resistor used to selectively slow rotation of a motor electrically coupled with a source of electric power other than the generator.
5. The system of aspect 4, wherein the controller circuitry is further configured to confirm that the dynamic braking resistor is not being used to slow rotation of the motor before directing supply of power to the second load from the load bus.
6. The system as in any of aspects 1-5, wherein the second load is a load substantially duplicative of the first load, or is a dynamic braking resistor selectively available to slow a motor electrically coupled with a source of electric power other than the generator, and the controller circuitry is configured to confirm the second load is duplicative of the first load or that the dynamic braking resistor is not currently being used to slow the motor before dynamically alternating supply of electric power to the first load and the second load.
7. The system as in any of aspect 1-6, wherein the load demand of the generator is substantially unchanged as the controller circuitry dynamically alternates between the first load and the second load such that the output torque of the gas turbine engine is also substantially unchanged.

8. A method comprising:
rotationally driving a generator with a gas turbine engine;
outputting electric power to a load bus with the generator to supply a load demand present on a the load bus;
energizing a first load with the load bus and increasing an output torque demand of the gas turbine engine in accordance with an increase in the load demand on the load bus;
cycling between energizing, with the load bus, the first load and a second load to substantially maintain the increase in the load demand on the load bus as the first load and the second load are sequentially energized and deenergized; and
maintaining the output torque demand of the gas turbine engine substantially unchanged during the cycling.

9. The method of aspect 8, wherein cycling between energizing the first load and the second load comprises energizing the second load and denergizing the first load in parallel, and energizing the first load and deenergizing the second load in parallel such that the load demand present on the load bus remains substantially unchanged.

10. The method as in aspect 8 or 9, wherein the first load and the second load are pulse loads that are substantially a same magnitude and duration, and cycling between energizing the first load and the second load comprises sequentially pulsing the first load and then the second load with electric power supplied from the load bus.

11. The method as in any of aspects 8-10, wherein the second load is a dynamic braking resistor configured for selective energization to slow a motor supplied electric power from another power source, and cycling between energizing the first load and the second load comprises confirming that the dynamic braking resistor is not being selectively energized to slow the motor before energizing the second load.

12. The method as in any of aspects 8-11, wherein cycling between energizing the first load and the second load comprises energizing the second load while the first load is being deenergized and subsequently energizing the first load while the second load is being deenergized.

13. The method as in any of aspects 8-12, wherein the second load is another load substantially equal to the first load, or is a dynamic braking resistor configured for selective energization to slow a motor supplied electric power from another power source, and wherein cycling between energizing the first load and the second load comprises confirming the another load is unavailable and then confirming that the dynamic braking resistor is not being used to slow the motor before energizing the dynamic braking resistor.

14. The method of 13, further comprising discontinuing cycling, maintaining energization of the dynamic braking resistor and decreasing an output torque of the gas turbine engine.

15. The method as in any of aspects 8-14, further comprising monitoring an operating temperature of the gas turbine engine, and adjusting a cycling time of cycling between energizing, with the load bus, the first load and a second load to minimize thermal cycling of the operating temperature above a predetermined threshold.

16. A system comprising:
controller circuitry configured to:
monitor an operational parameter of a gas turbine engine;
control a load demand of a generator to output electric power on a load bus, the generator rotatably driven to generate electric power by output torque of the gas turbine engine;
control energization and de-energization of a first load as a load on the load bus;
control energization and de-energization of a second load as the load on the load bus;
transition between the load on the load bus being the first load and being the second load; and
maintain the load on the load bus substantially unchanged by timing the transition between the load on the load bus being the first load and being the second load.

17. The system of aspect 16, wherein the first load and the second load are substantially equal pulse loads.

18. The system as in aspect 16 or 17, wherein the first load is a first equipment load, and the second load is a dynamic braking resistor or a second equipment load.

19. The system of aspect 18, wherein the controller circuitry is further configured to selective control energization and de-energization of the dynamic braking resistor by confirmation, prior to energization, that the dynamic braking resistor is not being energized by a power source supplying a drive motor for a vehicle.

20. The system of aspect 19, where the vehicle is a ship, and the drive motor is supplied power by the power source to provide propulsion of the ship.

In addition to the features mentioned in each of the independent aspects enumerated above, some examples may show, alone or in combination, the optional features mentioned in the dependent aspects and/or as disclosed in the description above and shown in the figures.

What is claimed is:

1. A system comprising:
a gas turbine engine;
a generator coupled with the gas turbine engine, the generator rotatable by the gas turbine engine to generate electric power on a load bus;
controller circuitry configured to control the load bus to manage an output torque of the gas turbine engine in accordance with a load demand present on the generator; and
a first load and a second load, the controller circuitry configured to dynamically alternate supply of electric power from the load bus to the first load and the second load to maintain operational transient parameters of the gas turbine engine within a predetermined range.

2. The system of claim 1, wherein the first load and the second load are each a pulse load of greater than 50% of rated output power of the generator.

3. The system of claim 2, wherein the impedance of the first load and the second load are substantially equal.

4. The system of claim 1, wherein the second load is a dynamic braking resistor used to selectively slow rotation of a motor electrically coupled with a source of electric power other than the generator.

5. The system of claim 4, wherein the controller circuitry is further configured to confirm that the dynamic braking resistor is not being used to slow rotation of the motor before directing supply of power to the second load from the load bus.

6. The system of claim 1, wherein the second load is a load substantially duplicative of the first load, or is a dynamic braking resistor selectively available to slow a motor electrically coupled with a source of electric power other than the generator, and the controller circuitry is configured to confirm the second load is duplicative of the first load or that the dynamic braking resistor is not currently being used to slow the motor before dynamically alternating supply of electric power to the first load and the second load.

7. The system of claim 1, wherein the load demand of the generator is substantially unchanged as the controller circuitry dynamically alternates between the first load and the second load such that the output torque of the gas turbine engine is also substantially unchanged.

8. A method comprising:
rotationally driving a generator with a gas turbine engine;
outputting electric power to a load bus with the generator to supply a load demand present on a load bus;
energizing a first load with the load bus and increasing an output torque demand of the gas turbine engine in accordance with an increase in the load demand on the load bus;
cycling between energizing, with the load bus, the first load and a second load to substantially maintain the increase in the load demand on the load bus as the first load and the second load are sequentially energized and deenergized; and
maintaining the output torque demand of the gas turbine engine substantially unchanged during the cycling.

9. The method of claim 8, wherein cycling between energizing the first load and the second load comprises energizing the second load and denergizing the first load in parallel, and energizing the first load and deenergizing the second load in parallel such that the load demand present on the load bus remains substantially unchanged.

10. The method of claim 8, wherein the first load and the second load are pulse loads that are substantially a same magnitude and duration, and cycling between energizing the first load and the second load comprises sequentially pulsing the first load and then the second load with electric power supplied from the load bus.

11. The method of claim 8, wherein the second load is a dynamic braking resistor configured for selective energization to slow a motor supplied electric power from another power source, and cycling between energizing the first load and the second load comprises confirming that the dynamic braking resistor is not being selectively energized to slow the motor before energizing the second load.

12. The method of claim 8, wherein cycling between energizing the first load and the second load comprises energizing the second load while the first load is being deenergized and subsequently energizing the first load while the second load is being deenergized.

13. The method of claim 8, wherein the second load is another load substantially equal to the first load, or is a dynamic braking resistor configured for selective energization to slow a motor supplied electric power from another power source, and wherein cycling between energizing the first load and the second load comprises confirming the another load is unavailable and then confirming that the dynamic braking resistor is not being used to slow the motor before energizing the dynamic braking resistor.

14. The method of 13, further comprising discontinuing cycling, maintaining energization of the dynamic braking resistor and decreasing an output torque of the gas turbine engine.

15. The method of claim 8, further comprising monitoring an operating temperature of the gas turbine engine, and adjusting a cycling time of cycling between energizing, with the load bus, the first load and a second load to minimize thermal cycling of the operating temperature above a predetermined threshold.

16. A system comprising:
controller circuitry configured to:
monitor an operational parameter of a gas turbine engine;
control a load demand of a generator to output electric power on a load bus, the generator rotatably driven to generate electric power by output torque of the gas turbine engine;
control energization and de-energization of a first load as a load on the load bus;
control energization and de-energization of a second load as the load on the load bus;
transition between the load on the load bus being the first load and being the second load; and
maintain the load on the load bus substantially unchanged by timing the transition between the load on the load bus being the first load and being the second load.

17. The system of claim 16, wherein the first load and the second load are substantially equal pulse loads.

18. The system of claim 16, wherein the first load is a first equipment load, and the second load is a dynamic braking resistor or a second equipment load.

19. The system of claim 18, wherein the controller circuitry is further configured to selective control energization and de-energization of the dynamic braking resistor by confirmation, prior to energization, that the dynamic braking resistor is not being energized by a power source supplying a drive motor for a vehicle.

20. The system of claim 19, where the vehicle is a ship, and the drive motor is supplied power by the power source to provide propulsion of the ship.

* * * * *